(12) United States Patent
Butterfield

(10) Patent No.: US 8,844,114 B2
(45) Date of Patent: Sep. 30, 2014

(54) SYSTEM AND METHOD FOR AN ENGINEERED JOINT

(71) Applicant: Donal Butterfield, New York City, NY (US)

(72) Inventor: Donal Butterfield, New York City, NY (US)

( * ) Notice: Subject to any disclaimer, the term of this patent is extended or adjusted under 35 U.S.C. 154(b) by 0 days.

(21) Appl. No.: 14/086,953

(22) Filed: Nov. 21, 2013

(65) Prior Publication Data

US 2014/0079466 A1   Mar. 20, 2014

Related U.S. Application Data

(63) Continuation-in-part of application No. 13/898,387, filed on May 20, 2013, now abandoned.

(60) Provisional application No. 61/654,263, filed on Jun. 1, 2012.

(51) Int. Cl.

| | |
|---|---|
| *B23P 11/00* | (2006.01) |
| *B23P 17/00* | (2006.01) |
| *E02B 15/08* | (2006.01) |
| *E05D 7/00* | (2006.01) |
| *E05D 3/02* | (2006.01) |
| *F16C 11/12* | (2006.01) |
| *E05D 5/14* | (2006.01) |

(52) U.S. Cl.
CPC ............... *F16C 11/12* (2013.01); *E02B 15/085* (2013.01); *E05Y 2800/676* (2013.01); *E05D 7/009* (2013.01); *E05D 3/02* (2013.01); *E05D 2005/145* (2013.01); *E05D 5/14* (2013.01)
USPC ............................. 29/525.01; 405/28; 405/63

(58) Field of Classification Search
USPC ............. 405/70, 71, 72, 60, 63, 114, 115, 20, 405/24, 28, 33; 29/525.01; 16/225, 389
See application file for complete search history.

(56) References Cited

U.S. PATENT DOCUMENTS

| | | | | |
|---|---|---|---|---|
| 3,818,708 | A * | 6/1974 | Benson | 405/65 |
| 4,295,756 | A * | 10/1981 | Blair | 405/70 |
| 5,141,359 | A * | 8/1992 | Klockner | 405/26 |
| 5,267,813 | A * | 12/1993 | Neal | 405/72 |
| 5,385,427 | A * | 1/1995 | Kateley et al. | 405/68 |
| 5,480,262 | A * | 1/1996 | Russo, III | 405/66 |
| 5,553,972 | A * | 9/1996 | Bergeron et al. | 405/60 |
| 6,554,534 | B1 * | 4/2003 | Butterfield | 405/63 |
| 6,848,861 | B2 * | 2/2005 | Dreyer | 405/63 |
| 2008/0279634 | A1 * | 11/2008 | Heselden | 405/114 |

* cited by examiner

*Primary Examiner* — David Bryant
*Assistant Examiner* — Christopher M Koehler
(74) *Attorney, Agent, or Firm* — Stoll Keenon Ogden PLLC; Rebecca Ann Krefft

(57) ABSTRACT

A system and method for an engineered joint according to one example embodiment includes a hinge pin and loops that extend from membranes around the hinge pin. Multiple embodiments include loops that extend from an upper module membrane and cross to attach to a second upper module membrane and loops that extend from a first lower module membrane and cross to attach to a second lower module membrane.

20 Claims, 9 Drawing Sheets

US 8,844,114 B2

SYSTEM AND METHOD FOR AN ENGINEERED JOINT

CROSS-REFERENCE TO RELATED APPLICATIONS

This application claims priority as a continuation-in-part application of U.S. patent application Ser. No. 13/898,387, entitled "System and Method for an Engineered Joint" and filed on May 20, 2013, which claims priority to U.S. Provisional Application No. 61/654,263, entitled "System and Method for an Engineered Joint" and filed on Jun. 1, 2012, each of which is incorporated by reference herein in its entirety.

BACKGROUND

The present invention relates to systems and methods for engineered joints of flexible structures.

BRIEF DESCRIPTION OF THE DRAWINGS

Features and advantages of the various embodiments, and the manner of attaining them, will become more apparent and will be better understood by reference to the accompanying drawings.

DETAILED DESCRIPTION

Figure 1A:
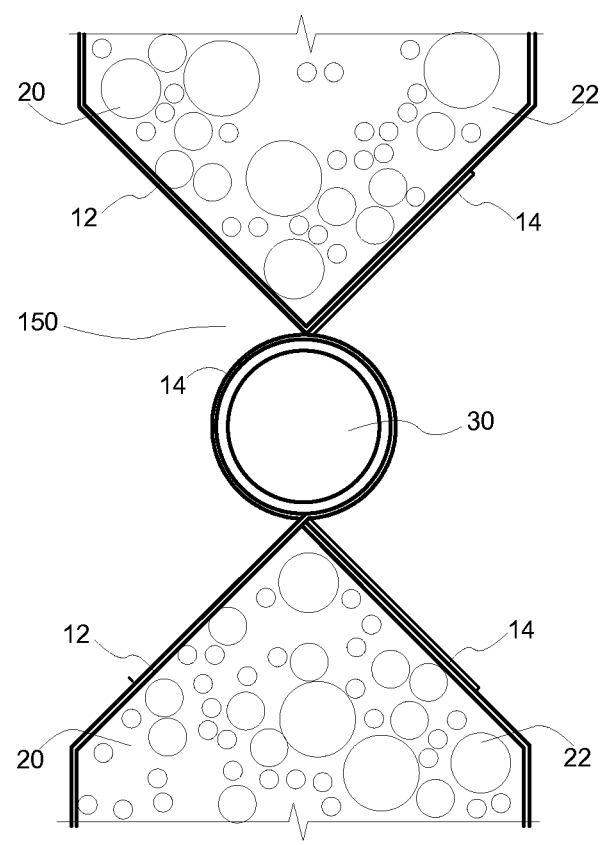
FIG. 1a is a cross-section view along the line A-A in FIG. 1b.

The following description and drawings illustrate embodiments sufficiently to enable those skilled in the art to practice the present invention. It is to be understood that the disclosure is not limited to the details of construction and the arrangement of components set forth in the following description or illustrated in the drawings. The invention is capable of other embodiments and of being practiced or of being carried out in various ways. For example, other embodiments may incorporate structural, chronological, electrical, process, and other changes. Examples merely typify possible variations. Individual components and functions are optional unless explicitly required, and the sequence of operations may vary. Portions and features of some embodiments may be included in or substituted for those of others. The scope of the application encompasses the appended claims and all available equivalents. The following description is, therefore, not to be taken in a limited sense.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Turning now to the drawings, and more particularly to FIGS. 1a, 1b, 4 and 5, example embodiments of an engineered joint 150 of a flexible structure are illustrated. The joint 150 includes a hinge pin 30 and loops 14. The loops 14 extend from or are attached to membranes 12 on modules 20, wrap around the hinge pin 30, and back to the modules 20 connecting them together. In certain embodiments, the engineered joint may be used as part of flexible structures to assist with separating or isolating liquids, such as those described in U.S. Pat. No. 6,554,534 to Butterfield (entitled "Flexible structure and method for controlling the quality of liquids"), which is incorporated by reference herein in its entirety.

In multiple embodiments, the membranes 12 are resilient impermeable membranes, such as those described in U.S. Pat. No. 6,554,534 to Butterfield. In certain embodiments, the membrane 12 is a vulcanized rubber, such as silicone rubber reinforced with a high strength silica filament or other non-corrosive fiber strong enough to resist tensile forces without elongating. However, the membrane 12 may consist of any other material that can be reinforced with various fibers for specific tensile loads, withstand a variety of chemicals and temperature extremes without physical or chemical change and be pigmented or coated with various colors, such as polypropylene, polyethylene, rubber, nylon or vinyl, for example.

In some embodiments, the membranes 12 may form single layer square-shaped modules, such as those described in U.S. Pat. No. 6,554,534 to Butterfield. The modules may be made and used in triangles, rectangles or any other shape, size or proportion. For example, the modules may be square-shaped and have a height of approximately four feet and a width of approximately four feet. The modules may be pigmented or coated with any color, including reflective finishes. In some embodiments, for example, the membranes may be white to retard marine growth.

In some embodiments, the module 20 consists of a foamed core 22 sandwiched between two layers of the impermeable membrane 12, such as that described in U.S. Pat. No. 6,554,534 to Butterfield. In such embodiments, the two layers of the impermeable membrane 12 may be sealed together at the edges of the module 20, with loops 14 at specific edges, and not at others. The module 20 may be made and used in triangles, rectangles or any other shape, size or proportion. For example, the module 20 may be square-shaped and have a height of approximately four feet and a width of approximately four feet. The module may be pigmented or coated with any color, including reflective finishes. In some embodiments, for example, the membranes may be white to retard marine growth.

In certain embodiments, the foam core 22 is a polystyrene block, foamed with a high volume of air or inert gas for lightness and high resistance to heat transfer, or insulation value. However, the core 22 may consist of any other material, either rigid or flexible, that can retain its large-celled sealed structure without deteriorating or failing due to chemical or physical impact, or the module may have no core 22.

In some embodiments, the loops 14 are formed continuously from the same material as the membrane 12. In other embodiments, the loops 14 may be attached to the membrane 12. The loops 14 may be formed from a vulcanized rubber, such as silicone rubber reinforced with a high strength silica filament or other non-corrosive fiber strong enough to resist tensile forces without elongating. However, the loops 14 may consist of any other material that can resist tensile loads, be reinforced with various fibers for specific strength, withstand a variety of chemicals and temperature extremes without physical or chemical change and be pigmented or coated with various colors, such as polypropylene, polyethylene, rubber, nylon or vinyl, for example. In some embodiments, the loops 14 may be attached to the membranes 12 using an adhesive that cures to a solid form of the same material as the membranes. In certain embodiments, the adhesive is room temperature vulcanizing (RTV) silicone rubber. However, the loops 14 may be attached to the membrane 12 using any other material that can resist tensile loads and withstand a variety of chemicals and temperature extremes without physical or chemical change, such as polypropylene, polyethylene, rubber, nylon or vinyl, for example.

Figure 2:
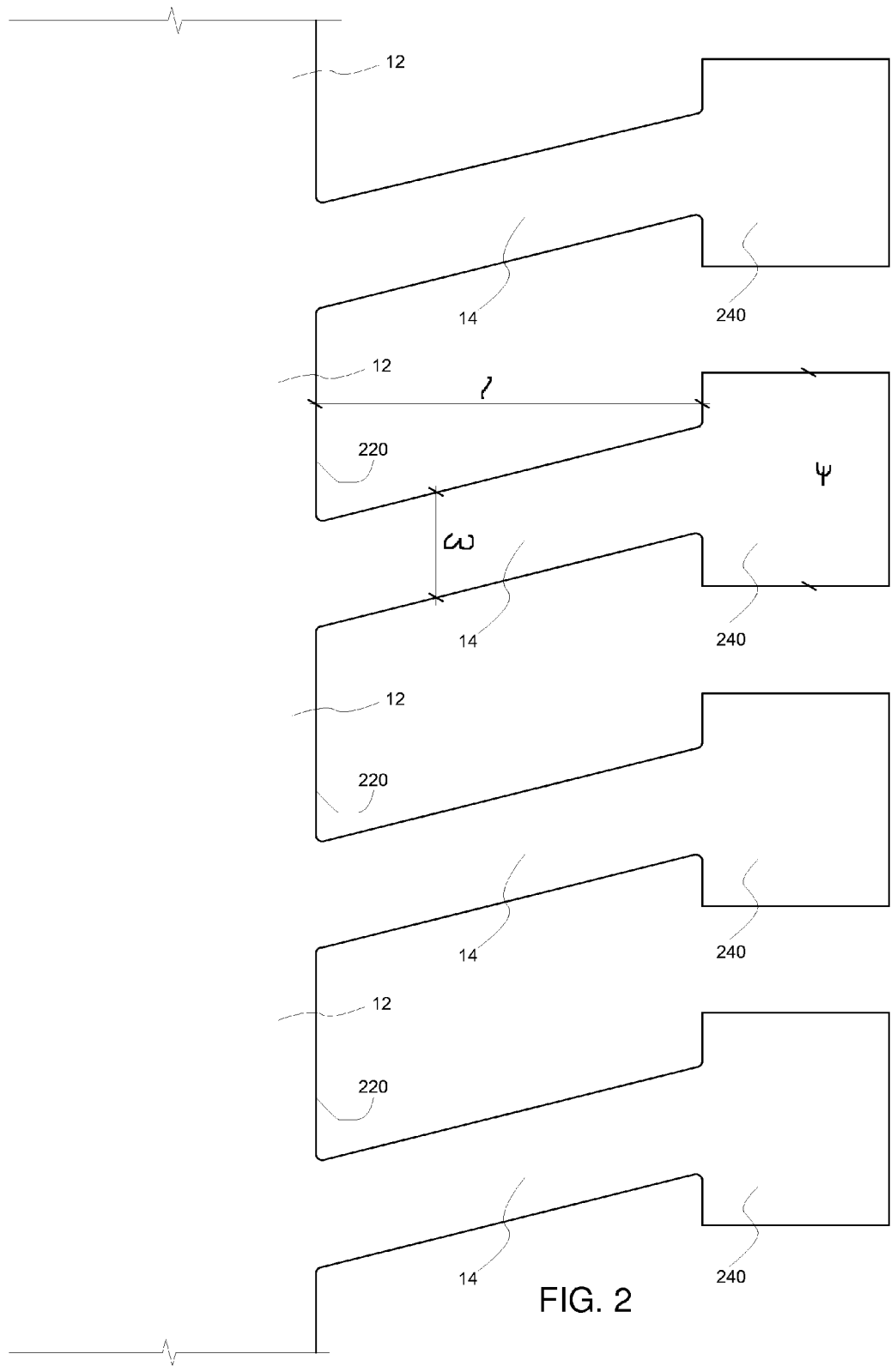
FIG. 2 is a top plan view of loops of the engineered joint according to multiple embodiments and alternatives.
Figure 6:
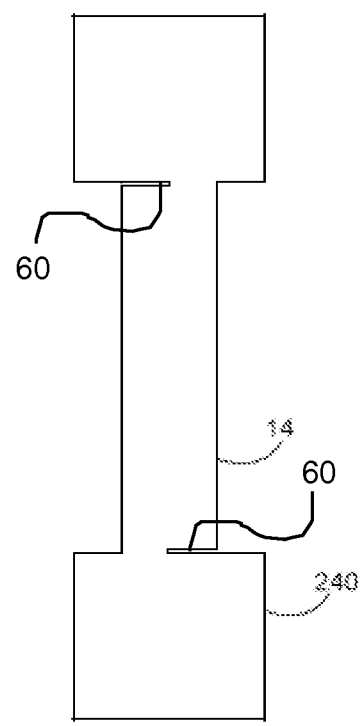
FIG. 6 is a top plan view of a loop of the engineered joint according to multiple embodiments and alternatives.

The loops 14 may be made and used in rectangles, squares, parallelograms or any other shape, size or proportion. As illustrated in FIG. 2, the loops 14 may be a parallelogram, and as illustrated in FIG. 6, the loops may be a rectangle. In some embodiments, the loops 14 have a length $\iota$ perpendicular to an edge 220 of the membrane 12 or perpendicular to an axis of rotation of the hinge pin. In certain embodiments, the length $\iota$ may be approximately the circumference of the hinge pin, which may reduce seepage of liquids, for example, through the joint 150. In some embodiments, the loops 14 have a width $\omega$ parallel to the edge 220 of the membrane 12. In certain embodiments, the width $\omega$ may be approximately two inches, three inches or five inches.

In some embodiments, the loops 14 may extend from the membrane 12 of the module 20 at an angle to a cross-section plane, at line A-A (shown in FIG. 1*b*), of the hinge pin. In certain embodiments, the width $\omega$ may be approximately two inches and the loops 14 may make approximately a fourteen degree angle with the cross-section plane at line A-A. In other embodiments, the loops 14 may extend from the membrane 12 of the module 20 parallel to the cross-section plane at line A-A or substantially perpendicular to the edge 220 of the membrane 12, for example, in some embodiments with a single layer module or with a double layer of membranes sandwiching a buoyant core. In certain embodiments, the width $\omega$ may be approximately two inches and the loops 14 may wrap around the hinge pin parallel to the cross-section plane at line A-A or substantially perpendicular to the axis of rotation of the hinge pin 30.

In some embodiments, a tab portion 240 may extend from the loops 14. In some embodiments, the tab portions 240 are formed continuously from the same material as the loops 14. In other embodiments, the tab portions 240 may be attached to the loops 14. The tab portions 240 may be formed from a vulcanized rubber, such as silicone rubber reinforced with a high strength silica filament or other non-corrosive fiber strong enough to resist tensile forces without elongating. However, the tab portions 240 may consist of any other material that can resist tensile loads, be reinforced with various fibers for specific strength, withstand a variety of chemicals and temperature extremes without physical or chemical change and be pigmented or coated with various colors, such as polypropylene, polyethylene, rubber, nylon or vinyl, for example. In some embodiments, the tab portions 240 may be attached to the loops 14 using an adhesive that cures to a solid form of the same material as the membranes. In certain embodiments, the adhesive is room temperature vulcanizing (RTV) silicone rubber. However, the tab portions 240 may be attached to the loops 14 using any other material that can resist tensile loads and withstand a variety of chemicals and temperature extremes without physical or chemical change, such as polypropylene, polyethylene, rubber, nylon or vinyl, for example.

The tab portion 240 may be made and used in rectangles, squares, parallelograms or any other shape, size or proportion. For example, it may be rectangular and have a width $\psi$ approximately two times the width $\omega$ of the loops 14. In certain embodiments, the width $\psi$ may be approximately four inches, six inches or ten inches.

Figure 8:
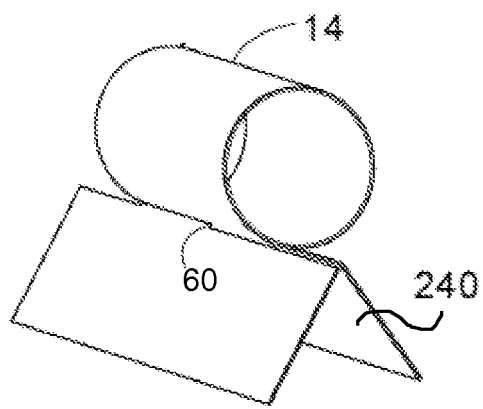
FIG. 8 is a perspective view of a loop of the engineered joint according to multiple embodiments and alternatives.

As shown in FIGS. 6 and 8, the loops 14 may include apertures 60 positioned at or near the tab portions 240. In some embodiments, the apertures 60 may be slits. The apertures 60 may have a width approximately one half of the width $\omega$ of the loops 14. In certain embodiments, the width of the apertures may be one inch and the width of the loops may be two inches, the width of the apertures may be one and a half inches and the width of the loops may be three inches or the width of the apertures may be two and a half inches and the width of the loops may be five inches.

Figure 4:
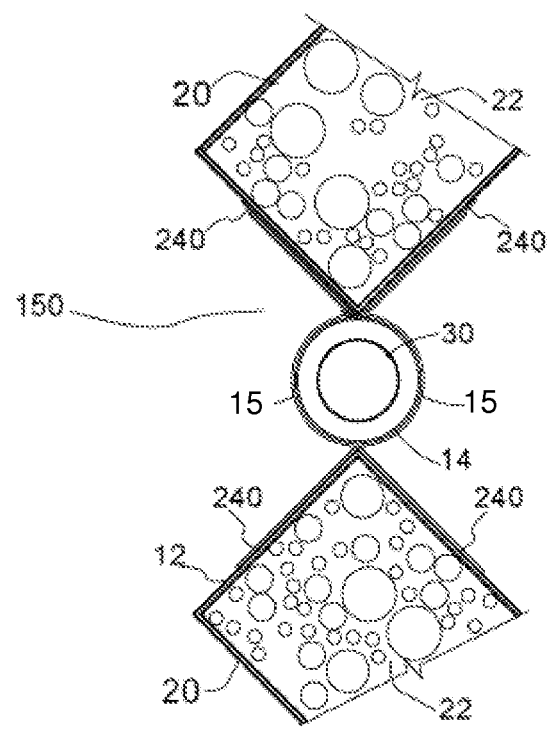
FIG. 4 is a cross-section view of an engineered joint of a flexible structure according to multiple embodiments and alternatives.
Figure 5:
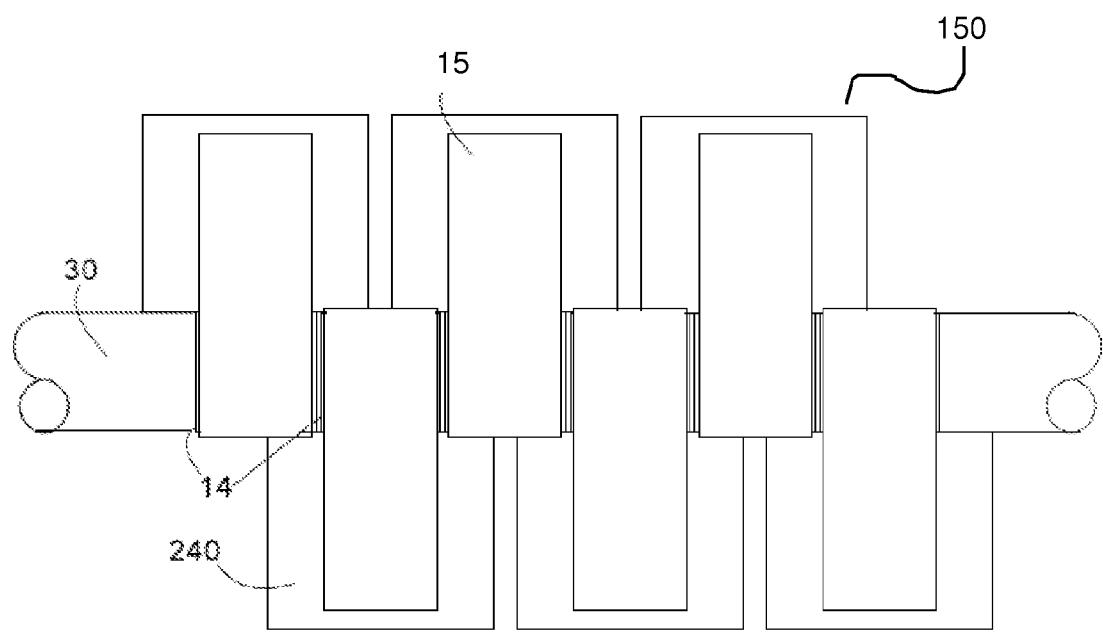
FIG. 5 is a side elevation view of the engineered joint according to multiple embodiments and alternatives.
Figure 7:
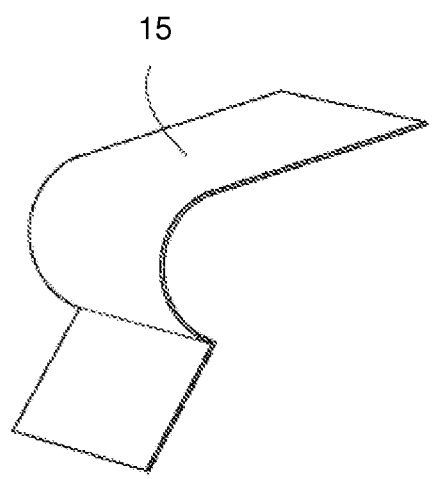
FIG. 7 is a perspective view of a reinforcing membrane of the engineered joint according to multiple embodiments and alternatives.

As illustrated in FIGS. 4, 5 and 7, the joint 150 may be reinforced with a reinforcing membrane 15 positioned over the apertures 60. The reinforcing membrane 15 may be formed from a vulcanized rubber, such as silicone rubber reinforced with a high strength silica filament or other non-corrosive fiber strong enough to resist tensile forces without elongating. However, the reinforcing membrane 15 may consist of any other material that can resist tensile loads, be reinforced with various fibers for specific strength, withstand a variety of chemicals and temperature extremes without physical or chemical change and be pigmented or coated with various colors, such as polypropylene, polyethylene, rubber, nylon or vinyl, for example. In some embodiments, the reinforcing membrane 15 may be attached to the loops 14 and the tab portions 240 using an adhesive that cures to a solid form of the same material as the membranes. In certain embodiments, the adhesive is room temperature vulcanizing (RTV) silicone rubber. However, the reinforcing membrane 15 may be attached to the loops 14 and the tab portions 240 using any other material that can resist tensile loads and withstand a variety of chemicals and temperature extremes without physical or chemical change, such as polypropylene, polyethylene, rubber, nylon or vinyl, for example.

The reinforcing membrane 15 may be made and used in rectangles, squares or any other shape, size or proportion. For example, it may be rectangular and have a width approximately equal to the width $\omega$ of the loops 14.

Returning to FIGS. 1*a*, 1*b*, 4 and 5, in some embodiments, the hinge pin 30 is a buoyant, hollow tube of acrylonitrile butadiene styrene (ABS). However, it may consist of any other non-corrosive, resilient and durable material of adequate rigidity, shearing and bearing strength, such as rigid nylon or wood. In some embodiments, the hinge pin 30 is slightly less than four feet in length. In other embodiments, it may be approximately five or six feet in length.

In multiple embodiments, the loops 14 wrap around the hinge pin 30 to connect the modules 20, creating a flexible connection that assists flexible structures in yielding to waves, currents and impact loads and in converting impact loads into tensile stresses. In some embodiments, the loops 14 from an upper module and a lower module wrap around the hinge pin 30 adjacent to one another. The loops 14 may extend parallel to the cross-section plane at line A-A or substantially perpendicular to the axis of rotation of the hinge pin 30. The loops 14 may also make an angle $\alpha$ with the cross-section plane at line A-A, for example, in some embodiments with two layers of membranes. In certain embodiments, the angle α may be approximately fourteen degrees.

Figure 1B:
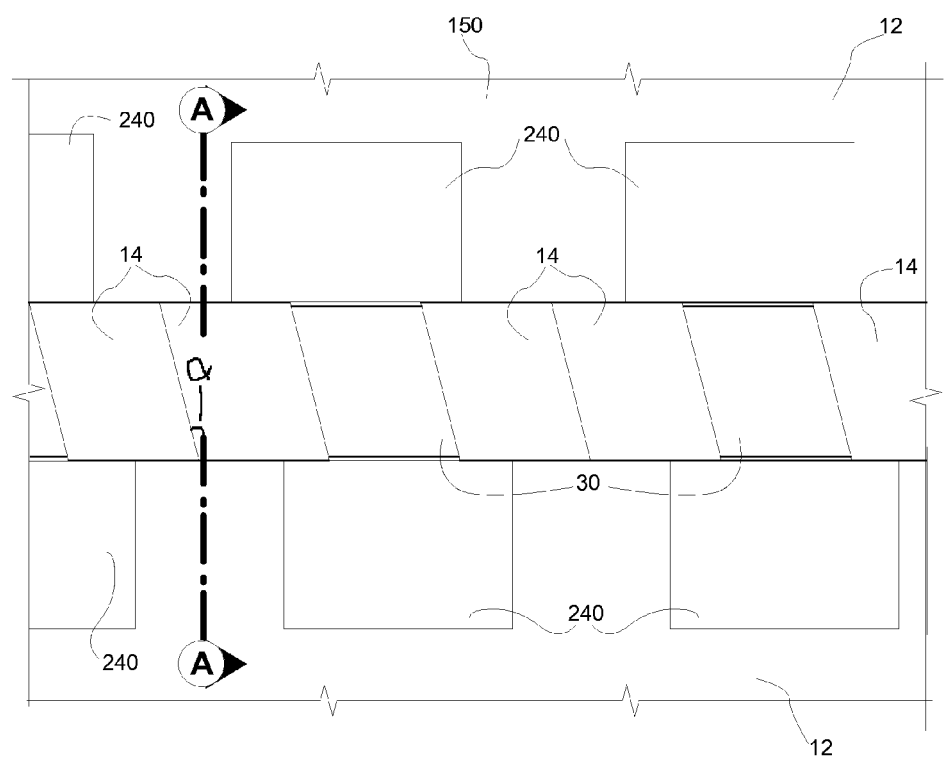
FIG. 1b is a side elevation view of an engineered joint of a flexible structure according to multiple embodiments and alternatives.

As illustrated in FIGS. 1a and 1b, in some embodiments, the loops 14 extend from one layer of membrane 12 to wrap around the hinge pin 30 in a spiral manner and cross to attach to the other layer of membrane 12 of the module. In such embodiments, when a vertical force is exerted on the modules 20 and joint 150, both vertical and horizontal force components are exerted on the loops 14. For example, if a vertical tensile force is exerted on the modules 20 and joint 150, both vertical and horizontal force components are exerted on the loops 14, the horizontal component pulling the two layers of membrane 12 together, reducing any peeling action of the tab portions 240 and the membranes 12 and increasing strength and durability of the joint 150.

As shown in FIG. 1b, in certain embodiments, the loops 14 from an upper module and a lower module may wrap around the hinge pin 30 such that the loops from the upper and lower modules interweave with or cross one another as they wrap around the hinge pin 30. Such an arrangement of the loops 14 may further reduce any peeling action of the tab portions 240 and the membranes 12 and increase strength and durability of the joint 150. In other embodiments, the loops 14 from an upper module and a lower module may extend around the hinge pin 30 such that the loops from the upper and lower modules do not interweave with or cross one another.

As illustrated in FIGS. 4, 5 and 8, in some embodiments, the loops 14 attach to one layer of membrane 12, wrap around the hinge pin 30, cross over themselves and hook together in apertures 60 and attach to the other layer of membrane 12 of the module. In such embodiments, when a vertical force is exerted on the modules 20 and joint 150, both vertical and horizontal force components are exerted on the loops 14. By crossing the loops, the horizontal component pulls the two layers of membrane 12 together, reduces any peeling action of the tab portions 240 and the membranes 12 and increases strength and durability of the joint 150. In certain embodiments, the joint 150 may be reinforced with the reinforcing membrane 15 positioned over the apertures 60. The reinforcing membrane 15 may further increase strength and durability of the joint 150.

In multiple embodiments, the loops 14 are attached back to the membranes 12 after they extend around the hinge pin 30. In some embodiments, the tab portion 240 is attached back to the membranes 12. In some embodiments, the loops 14 are attached back to the membranes 12 using an adhesive that cures to a solid form of the same material as the membranes. In certain embodiments, the adhesive is room temperature vulcanizing (RTV) silicone rubber. However, the loops 14 may be attached to the membrane 12 using any other material that can resist tensile loads and withstand a variety of chemicals and temperature extremes without physical or chemical change, such as polypropylene, polyethylene, rubber, nylon or vinyl, for example.

Persons of skill in the art will recognize that the engineered joint of the present invention provides features that may be used to good advantage in a variety of applications. For example, embodiments of the engineered joint resist chemical deterioration and marine growth from long exposure in seawater and so are more durable than materials used in conventional concrete and steel structures. Embodiments of the engineered joint also assist flexible structures in changing form with tidal motion or flooding, thereby reducing bending stresses. Thin membranes that resist only tension stresses are much cheaper than conventional rigid structures that resist bending stresses. In addition, embodiments of the engineered joint assist flexible structures in yielding to waves, currents and impact loads, converting them into tensile stresses too. Embodiments of the joint also pull layers of membranes together, reduce any peeling action of the membranes and increase joint strength and durability.

Figure 3:
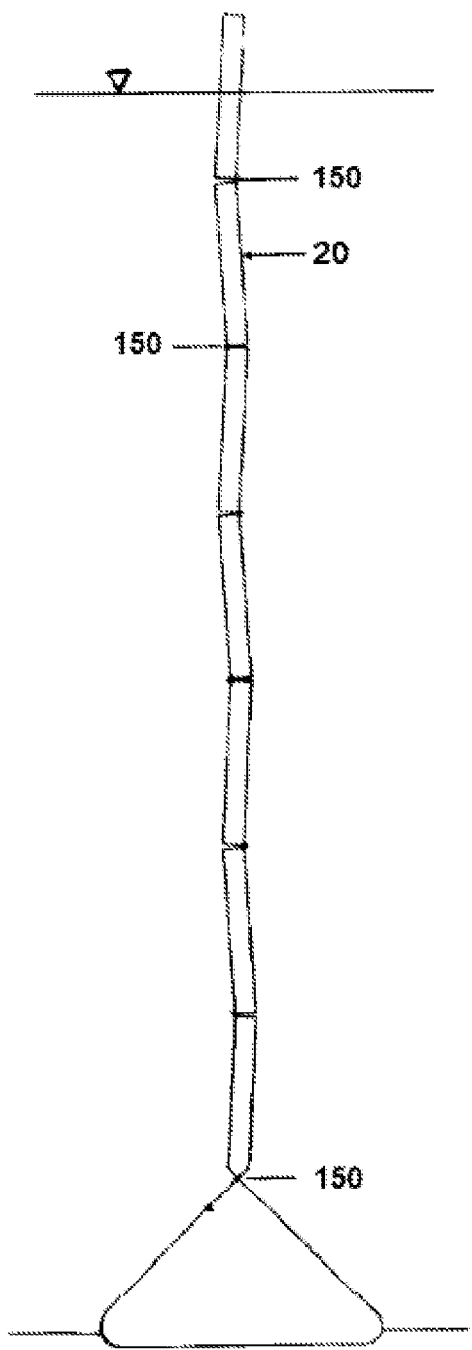
FIG. 3 is a front elevation view of a flexible structure with the engineered joint according to multiple embodiments and alternatives.

As illustrated in FIG. 3, embodiments of the engineered joint may be used as part of a flexible structure to assist with separating or isolating liquids. Advantages of flexible structures with embodiments of the engineered joint include: convenient volume and mass to facilitate handling, transportation and floating; simple parts and their assembly facilitating installing, removal, repair and replacement by unskilled workers; ease of dismantling to encourage easier government agency approvals for use in near shore waters than for conventional rigid structures; anchoring methods that simplify positioning the structures; greater economy than conventional structures; inert material that renders it more durable than conventional structures; buoyancy and flexibility that simplify stress patterns and reduce the material needed to resist them, further lowering the cost compared to rigid structures; hinges to avoid fatigue failure caused by repeated reverse bending; reduced seepage so it cannot affect liquids on the other side; improved isolation and separation, which improve filter efficiency by maintaining a low head on the pump; insulation against heat transfer through the structures; hinging methods to allow forms that adapt to varying water depths; adaptability to modifications to accommodate site conditions; flexibility that yields to impact and is safe for people, fish and boats; surfaces in various colors to absorb or reflect heat or to design visual effects for various esthetic or psychological purposes; and control of water (or other liquid) quality to motivate uses that would otherwise be unfeasible in polluted or frigid water.

The foregoing description of several embodiments has been presented for purposes of illustration. It is not intended to be exhaustive or to limit the application to the precise forms disclosed, and obviously many modifications and variations are possible in light of the above teaching. It is understood that the invention may be practiced in ways other than as specifically set forth herein without departing from the scope of the invention. It is intended that the scope of the application be defined by the claims appended hereto.

What is claimed is:

1. A system for an engineered joint, comprising:
   an upper module having a first upper module membrane and a second upper module membrane;
   a lower module having a first lower module membrane and a second lower module membrane;
   a hinge pin; and
   a plurality of loops extending around the hinge pin, wherein a first loop extends from the first upper module membrane around the hinge pin and crosses over itself to attach to the second upper module membrane, wherein a second loop extends from the first lower module membrane around the hinge pin and crosses over itself to attach to the second lower module membrane and wherein each of the loops has a pair of cooperating slots extending substantially parallel to the axis of the hinge pin and crosses over itself and connects to itself at the slots.

2. The system of claim 1, wherein a vertical force exerted on the engineered joint is distributed as vertical and horizontal force components on the loops to pull the first and second upper module membranes together and to pull the first and second lower module membranes together.

3. The system of claim 1, wherein the engineered joint is a flexible connection in a flexible structure to assist the flexible structure in yielding to waves, currents and impact loads.

4. The system of claim 1, further comprising an upper foamed core positioned between the first and second upper module membranes and a lower foamed core positioned between the first and second lower module membranes.

5. The system of claim 1, wherein each of the loops extends substantially perpendicular to an edge of the membrane from which it extends.

6. The system of claim 1, wherein each of the loops has a length perpendicular to the axis of the hinge pin and wherein the length of the loops is substantially equal to the circumference of the hinge pin.

7. The system of claim 1, further comprising a reinforcing membrane positioned over at least two of the slots.

8. The system of claim 1, wherein the second loop extends around the hinge pin adjacent to the first loop.

9. The system of claim 1, wherein the first loop is attached to the second upper module membrane and the second loop is attached to the second lower module membrane using an adhesive that cures to a solid form of the same material as the membranes.

10. The system of claim 1, further comprising a tab portion extending from each of the loops.

11. A system for an engineered joint, comprising:
    an upper module having a first upper module membrane and a second upper module membrane;
    a lower module having a first lower module membrane and a second lower module membrane;
    a hinge pin; and
    a plurality of loops extending around the hinge pin, each of the loops having a pair of cooperating slots extending substantially parallel to the axis of the hinge pin, wherein a first loop extends from the first upper module membrane around the hinge pin and crosses over itself to attach to the second upper module membrane and hooks to itself at the slots and wherein a second loop extends from the first lower module membrane around the hinge pin and crosses over itself to attach to the second lower module membrane and hooks to itself at the slots.

12. The system of claim 11, wherein a vertical force exerted on the engineered joint is distributed as vertical and horizontal force components on the loops to pull the first and second upper module membranes together and to pull the first and second lower module membranes together.

13. The system of claim 11, wherein the engineered joint is a flexible connection in a flexible structure to assist the flexible structure in yielding to waves, currents and impact loads.

14. The system of claim 11, further comprising an upper foamed core positioned between the first and second upper module membranes and a lower foamed core positioned between the first and second lower module membranes.

15. The system of claim 11, wherein each of the loops extends substantially perpendicular to an edge of the membrane from which it extends.

16. The system of claim 11, wherein each of the loops has a length perpendicular to the axis of the hinge pin and wherein the length of the loops is substantially equal to the circumference of the hinge pin.

17. The system of claim 11, further comprising a reinforcing membrane positioned over at least two of the slots.

18. The system of claim 11, wherein the second loop extends around the hinge pin adjacent to the first loop.

19. The system of claim 11, wherein the first loop is attached to the second upper module membrane and the second loop is attached to the second lower module membrane using an adhesive that cures to a solid form of the same material as the membranes.

20. The system of claim 11, further comprising a tab portion extending from each of the loops.

* * * * *